United States Patent
Ota

(10) Patent No.: US 10,221,825 B2
(45) Date of Patent: Mar. 5, 2019

(54) MISFIRE DETECTION DEVICE

(71) Applicant: SUBARU CORPORATION, Tokyo (JP)

(72) Inventor: Mao Ota, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/991,992

(22) Filed: Jan. 10, 2016

(65) Prior Publication Data

US 2016/0222893 A1   Aug. 4, 2016

(30) Foreign Application Priority Data

Feb. 2, 2015  (JP) ................... 2015-018496

(51) Int. Cl.
*F02P 9/00* (2006.01)
*F02D 41/14* (2006.01)
*G01M 15/11* (2006.01)
*G01M 15/00* (2006.01)

(52) U.S. Cl.
CPC .......... *F02P 9/002* (2013.01); *F02D 41/1497* (2013.01); *G01M 15/11* (2013.01); *F02D 2200/101* (2013.01); *F02D 2200/1015* (2013.01); *G01M 15/00* (2013.01)

(58) Field of Classification Search
CPC ................ F02P 9/002; F02D 41/1497; F02D 2200/101; F02D 2200/1015; G01M 15/11; G01M 15/00
See application file for complete search history.

(56) References Cited

U.S. PATENT DOCUMENTS 5,263,365 A * 11/1993 Muller ............... G01M 15/11
                                                                701/111
5,275,037 A *  1/1994 Nakayama .......... G01M 15/11
                                                                73/114.03
(Continued)

FOREIGN PATENT DOCUMENTS

JP      H05-018311 A    1/1993
JP      06-336948 A    12/1994
(Continued)

OTHER PUBLICATIONS

Office Action received for Japanese Patent Application No. 2015-018496, dated Jun. 21, 2016, 10 pages of office action including 6 pages of English translation.

*Primary Examiner* — Joseph Dallo
*Assistant Examiner* — Kurt Liethen
(74) *Attorney, Agent, or Firm* — Chip Law Group

(57) ABSTRACT

A misfire detection device for an engine having cylinders includes: a crank angle detector that detects an angular position of a crankshaft; a rotational speed calculator that calculates a rotational speed of the crankshaft on the basis of an output from the crank angle detector; and a misfire detector that obtains a difference between a rotational speed of the crankshaft in a combustion process in a diagnosis target cylinder and a rotational speed of the crankshaft in a combustion process in a last cylinder whose ignition order is immediately before the diagnosis target cylinder, and carries out a misfire detection by using a diagnostic value set on the basis of the difference.

8 Claims, 4 Drawing Sheets

(56) References Cited

U.S. PATENT DOCUMENTS

| | | | | |
|---|---|---|---|---|
| 5,307,671 A * | 5/1994 | Akase | G01M 15/11 | 73/114.04 |
| 5,499,536 A * | 3/1996 | Wier | F02B 75/16 | 701/111 |
| 5,499,537 A * | 3/1996 | Nakayama | G01M 15/11 | 701/111 |
| 5,832,404 A * | 11/1998 | Amano | G01M 15/11 | 701/110 |
| 6,023,964 A * | 2/2000 | Kanbara | G01M 15/11 | 701/110 |
| 6,112,149 A * | 8/2000 | Varady | F02B 75/22 | 123/406.24 |
| 6,816,775 B2 * | 11/2004 | Barho | G01M 15/11 | 123/406.14 |
| 7,293,453 B2 * | 11/2007 | Aono | F02D 41/123 | 701/111 |
| 7,503,207 B2 * | 3/2009 | Nishigaki | G01M 15/11 | 73/114.02 |
| 2002/0183919 A1 * | 12/2002 | Matsui | F02D 35/023 | 701/114 |
| 2010/0030455 A1 * | 2/2010 | Akimoto | B60K 6/445 | 701/111 |
| 2011/0270505 A1 * | 11/2011 | Chaturvedi | F02D 41/1498 | 701/102 |
| 2013/0340512 A1 * | 12/2013 | Horlbeck | F02D 41/1497 | 73/114.02 |
| 2017/0299468 A1 * | 10/2017 | Jino | G01M 15/11 | |

FOREIGN PATENT DOCUMENTS

| | | |
|---|---|---|
| JP | 06336948 A * | 12/1994 |
| JP | H09-166042 A | 6/1997 |
| JP | 2853334 B | 2/1999 |
| JP | 2002-004936 A | 1/2002 |
| JP | 2002-047996 A | 2/2002 |
| JP | 2004-044401 A | 2/2004 |
| JP | 2004044401 A * | 2/2004 |
| JP | 2006-152971 A | 6/2006 |

* cited by examiner

BASIC MODEL

LAST-AND-NEXT
COMPARISON MODEL

MISFIRE DETECTION DEVICE

CROSS-REFERENCE TO RELATED APPLICATIONS

The present application claims priority from Japanese Patent Application No. 2015-018496 filed on Feb. 2, 2015, the entire contents of which are hereby incorporated by reference.

BACKGROUND

1. Technical Field

The present disclosure relates to misfire detection devices that detect misfires in spark ignition type engines. More particularly, the present disclosure relates to a misfire detection device capable of appropriately detecting a misfire even in a state in which combustion is unstable.

2. Related Art

For instance, a spark ignition type internal combustion engine such as an automotive four stroke gasoline engine is required to appropriately detect a misfire state in which an air-fuel mixture is not ignited normally from any cause and combustion is not carried out.

As a prior art related to a misfire detection device for an engine, for instance, Japanese Unexamined Patent Application Publication No. 2002-4936 describes that a detection threshold for detecting a misfire during rapid catalyst warm-up control is made different from that during usual operation so as to appropriately detect a misfire depending on an operating state of an internal combustion engine.

Japanese Unexamined Patent Application Publication No. H05-18311 describes that a detection value for misfire detection is changed so as to be hard to be determined as a misfire when an operating state of an engine is in a transient state such as warming-up-enrichment execution, rapid acceleration/deceleration, or warming-up retard.

Japanese Unexamined Patent Application Publication No. 2002-47996 describes that a detection value is calculated with use of a difference in a rotational speed from an adjacent cylinder and a difference between a rotational speed of a cycle and a rotational speed of a cycle immediately before the cycle of an identical cylinder, so as to reduce effects of manufacturing variation, attachment error and the like of a rotational angle sensor that detects a rotational angle of a crankshaft.

Japanese Patent No. 2853334 describes that learning correction is carried out by sequentially computing a correction coefficient of a crank angle sensor with respect to variation in vane angular intervals with use of a sum of cycles between crank angles of identification cylinder groups.

Japanese Unexamined Patent Application Publication No. H09-166042 describes that a transient correction term is used for computing a crank angle deviation time between cylinders in order to eliminate effects of transitional increase and decrease in rotation variation depending on an operating condition of an internal combustion engine at a time of rapid acceleration or rapid deceleration.

Japanese Unexamined Patent Application Publication No. 2006-152971 describes that a ratio of misfire detection values is computed between a cylinder having a possibility of misfire and cylinders before and after the cylinder at a time of detecting a misfire.

SUMMARY OF THE INVENTION

In comparison with usual operation, a combustion variation for each ignition cycle increases during fast idle that is an operation for promoting warming up carried out immediately after cold starting of an engine, for instance. Accordingly, it is necessary to extract an engine rotational speed change unique to misfire and to appropriately distinguish a normal state from a misfire state.

In conventional misfire diagnosis, a lowest S/N ratio (diagnostic accuracy) of a diagnostic value is obtained during the fast idle, and therefore the S/N ratio has to be improved in order to improve false detection resistance.

It is considered that factors in decrease in the S/N ratio include unstable combustion as a result of rapid catalyst warm-up control (ignition timing retard or the like) as a measure for exhaust gas and small generated torque for each cylinder. Due to such unstable combustion, sometimes a torque variation larger than that in usual operation occurs, a difference value of an engine revolution speed is generated, and a state is falsely detected as a misfire state even in a case where ignition is carried out normally.

In a case where torque generated in a normal state is small, an amount of change in revolution speed when a misfire occurs also becomes small. Accordingly, an object to be achieved in misfire diagnosis in a fast idle state is to suppress increase in noise (normal imbalance) and decrease in signal (amount of change in misfire).

A diagnostic value generally used at present is computed by comparing a currently generated revolution difference value and a revolution difference value generated one cycle before.

This computation method has an effect of cancelling diagnosis disturbance elements such as continuous change in revolution speed, sensor plate teeth imbalance in a crank angle sensor and imbalance between cylinders. Accordingly, diagnosis is possible substantially in all engine operating regions.

However, this computation method is premised on that engine revolution speed in the cylinder does not change suddenly by one ignition cycle. In other words, an assumption that "the currently generated revolution difference value"≈"the revolution difference value generated one cycle before"≈0 is established in a normal steady state is a premise.

Such assumption is not always established in the fast idle state having a large combustion variation. Accordingly, there is a fear that a correlation between "the currently generated revolution difference value" and "the revolution difference value generated one cycle before" breaks and the comparison of both values encourages diagnostic value imbalance.

In view of the above problems, an object of the present disclosure is to provide a misfire detection device capable of appropriately detect a misfire even in a combustion unstable state.

The present disclosure is to solve the above-mentioned problems by the following solutions.

A first aspect of the present disclosure provides a misfire detection device for an engine having cylinders, the misfire detection device including: a crank angle detector that detects an angular position of a crankshaft; a rotational speed calculator that calculates a rotational speed of the crankshaft on the basis of an output from the crank angle detector; and a misfire detector that obtains a difference between a rotational speed of the crankshaft in a combustion process in a diagnosis target cylinder and a rotational speed of the crankshaft in a combustion process in a last cylinder in which ignition has been carried out immediately before the diagnosis target cylinder, and carries out a misfire detection by using a diagnostic value set on the basis of the difference.

The misfire detection device may further include: an each-cylinder corrector that computes the rotational speed of the crankshaft in each of the combustion process in the diagnosis target cylinder and a combustion process in a comparative cylinder, and corrects the diagnostic value on the basis of a difference between the rotational speed in the combustion process in the diagnosis target cylinder and the rotational speed in the combustion process in the comparative cylinder.

The misfire detection device may further include: a rotational speed change corrector that corrects the diagnostic value on the basis of an amount of change in the rotational speed of the crankshaft between cycles in the combustion process in the diagnosis target cylinder.

The rotational speed change corrector may stop correcting the diagnostic value in a case where an amount of change in the rotational speed of the crankshaft per unit time is less than a predetermined threshold.

The misfire detector may carry out the misfire detection by comparing a predetermined detection threshold with a model difference value that is a square root of a value obtained by subtracting ½ of a product of a diagnostic value of the diagnosis target cylinder and a diagnostic value of the last cylinder from a square of the diagnostic value of the diagnosis target cylinder.

The misfire detector may carry out the misfire detection by comparing a predetermined detection threshold with a model difference value that is a square root of a value obtained by subtracting ½ of a product of a diagnostic value of the diagnosis target cylinder and a diagnostic value of a next cylinder in which ignition has been carried out immediately after the diagnosis target cylinder from a square of the diagnostic value of the diagnosis target cylinder.

The misfire detector may carry out the misfire detection by comparing a predetermined detection threshold with a model difference value that is a square root of a value obtained by subtracting each of ½ of a product of a diagnostic value of the diagnosis target cylinder and a diagnostic value of the last cylinder, and ½ of a product of the diagnostic value of the diagnosis target cylinder and a diagnostic value of a next cylinder in which ignition has been carried out immediately after the diagnosis target cylinder from a square of the diagnostic value of the diagnosis target cylinder.

DETAILED DESCRIPTION

Figure 1:
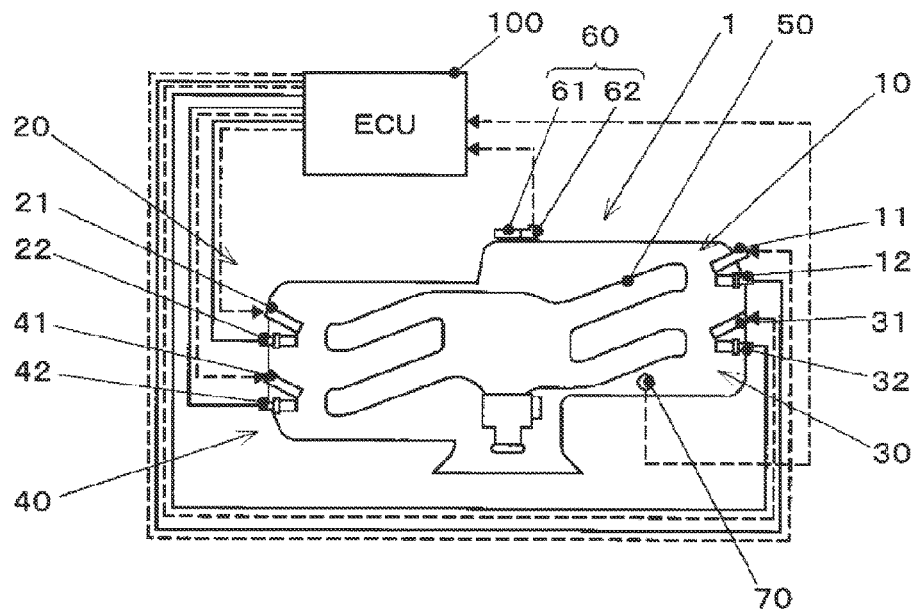
FIG. 1 is a block diagram illustrating a schematic configuration of an example of a misfire detection device according to the present disclosure.

Hereinafter, a preferred example of the present disclosure will be described in detail with reference to the appended drawings. Note that, in this specification and the appended drawings, structural elements that have substantially the same function and structure are denoted with the same reference numerals, and repeated description of these structural elements is omitted.

The present disclosure achieves the object to provide the misfire detection device capable of appropriately detecting a misfire even in a combustion unstable state, by setting, as a main diagnostic value, a value obtained by comparing an engine revolution speed in a combustion process in a diagnosis target cylinder and an engine revolution speed in a combustion process in a cylinder in which explosion has been carried out immediately before the diagnosis target cylinder, carrying out each-cylinder correction and revolution speed change correction, and comparing a preset threshold and a model difference value obtained by the three-point model detection method.

The example of the misfire detection device for an engine according to the present disclosure is explained below.

For instance, the misfire detection device according to the example is provided for an automotive gasoline engine, and detects whether or not an air-fuel mixture has been ignited normally for each ignition cycle with respect to an individual cylinder.

FIG. 1 is a block diagram illustrating a schematic configuration of the misfire detection device according to the example.

For instance, an engine 1 is a horizontally opposed four-stroke four-cylinder gasoline engine mounted as a traveling power source on a vehicle such as a passenger vehicle.

The engine 1 includes a first cylinder 10, a second cylinder 20, a third cylinder 30, and a fourth cylinder 40 that are sequentially disposed from a front-end-part side (opposite side from a transmission) of a crankshaft (not illustrated).

With regard to the engine 1, for instance, the crankshaft is vertically disposed, almost in a front-and-rear direction of a vehicle. The first cylinder 10 and the third cylinder 30 are accommodated in a right bank disposed at a right side in a vehicle width direction, and the second cylinder 20 and the fourth cylinder 40 are accommodated in a left bank disposed at a left side in the vehicle width direction.

The first cylinder 10, the second cylinder 20, the third cylinder 30, and the fourth cylinder 40 are disposed in a manner that the first cylinder 10 faces the second cylinder 20 substantially across the crankshaft and the third cylinder 30 faces the fourth cylinder 40 substantially across the crankshaft in a state in which the first cylinder 10, the second cylinder 20, the third cylinder 30, and the fourth cylinder 40 are apart by an offset amount of a crank pin of each cylinder.

In the engine 1, ignition (explosion) is set in the first cylinder 10, the third cylinder 30, the second cylinder 20, and the fourth cylinder 40 in this order. The ignition (explosion) is carried out at substantially equal intervals every 180° in a crank angle.

Each of the cylinders 10 to 40 includes a piston, a combustion chamber, air intake-and-exhaust ports, air intake-and-exhaust valves, a valve operating mechanism, and the like. In addition, the cylinders 10, 20, 30, and 40 respectively includes injectors 11, 21, 31, and 41 and spark plugs 12, 22, 32, and 42.

The injectors 11 to 41 are each an injection device for injecting atomized gasoline into the combustion chamber of each of the cylinders.

The fuel injection amount and the fuel injection timing of the injectors 11 to 41 are controlled by an engine control unit (ECU) 100 depending on the operating state of the engine 1.

The spark plugs 12 to 42 each ignite an air-fuel mixture by an electric spark, the air-fuel mixture having been generated in each of the cylinder.

The ECU 100 controls an ignition timing of each of the spark plugs 12 to 42.

In addition to the above structural elements, the engine 1 includes an air intake device 50 for introducing a predetermined amount of combustion air into each of the cylinders, and an air exhaust device, an exhaust gas aftertreatment device, a supercharger, a variable valve timing device, a cooling device, a lubrication device an EGR device, and the like that are not illustrated.

The engine 1 further includes a crank angle sensor 60 and a coolant temperature sensor 70. Note that the crank angle sensor 60 serves as the crank angle detector of the appended claims in the present example.

The crank angle sensor 60 detects an angular position of a crankshaft (not illustrated) serving as an output shaft of the engine 1.

The crank angle sensor 60 includes a sensor plate 61, a position sensor 62, and the like.

The sensor plate 61 is a disc-shaped member fixed to a front end part of the crankshaft, and has a sprocket shape in a manner that vanes (teeth) protrude radially from a periphery at predetermined angular intervals.

The position sensor 62 is a magnetic pickup disposed so as to face the periphery of the sensor plate 61, and includes a magnet, a core, a coil, a terminal, and the like.

The position sensor 62 outputs a predetermined pulse signal when the vane of the sensor plate 61 passes in front of the position sensor 62.

The coolant temperature sensor 70 determines a temperature of a coolant flowing in a water jacket serving as a coolant flow channel formed in a cylinder head and a cylinder.

Outputs from the crank angle sensor 60 and the coolant temperature sensor 70 are transmitted to the ECU 100.

The ECU 100 totally controls the engine 1 and its auxiliary machinery.

The ECU 100 includes, for instance, an information processing device such as a CPU, a storage device such as ROM or RAM, an input/output interface, a bus for connecting them, and the like.

The ECU 100 controls an opening degree of a throttle valve (not illustrated), the fuel injection amount, the fuel injection timing, the ignition timing, a valve timing, and the like, depending on a required torque set by an accelerator operation or the like carried out by a driver, for instance.

The ECU 100 carries out a fast idle operation so as to promote warming up, in a case where the coolant temperature sensor 70 determines a coolant temperature is in a predetermined low-temperature state.

At a time of the fast idle operation, a target idle revolution speed is increased, a fuel amount is increased, and an ignition timing is delayed, for instance.

The ECU 100 also serves as a misfire detector that detects a misfire state in which an air-fuel mixture is not ignited normally in a particular cylinder of the engine 1, on the basis of a crankshaft rotational speed sequentially computed on the basis of an output from the crank angle sensor 60.

Next, details of the misfire detection by the ECU 100 are described.

<Main Diagnostic Value>

In the present example, domg (see Formula 1) for picking up only reduction in an engine revolution speed at a time of a misfire is adopted as the main diagnostic value of a difference formula used for detecting the misfire.

$$\text{Main diagnostic value: } domg = omg1 - omg0 \qquad \text{Formula 1}$$

where omg0 represents an average rotational speed of a crankshaft in a combustion process (explosion process and expansion process) of a diagnosis target cylinder, and omg1 represents an average rotational speed of a crankshaft of a cylinder (last cylinder) in which ignition has been carried out immediately before the diagnosis target cylinder and a combustion process has been carried out.

By comparing the main diagnostic value with a preset threshold, an S/N ratio=approximately 1 can be secured, and an advantage over other diagnostic values of prior arts can be confirmed.

Note that, the main diagnostic value domg computes only a change in rotational speed from that of an adjacent cylinder (last cylinder), and therefore a temporal change in the rotational speed and measuring error of rotational speeds between cylinders due to component tolerance of a sensor plate 61 are not considered.

So as to cancel such effects, corrections (to be described later) are carried out.

<Revolution Speed Change Correction Term and Comparison Term>

Under a situation in which the engine revolution speed changes continuously, the main diagnostic value domg is offset with a certain value.

More particularly, when the engine revolution speed tends to decrease, it is concerned that a diagnostic value increases and false detection by which a misfire is detected occurs although no misfire occurs actually.

Accordingly, with respect to the main diagnostic value, a revolution speed change correction term neslopeA (see Formula 2) is added.

$$\text{Revolution speed change correction term: } neslopeA = \{(omg5 - omg1)/4 + (omg9 - omg5)/4\}/2 = (omg9 - omg1)/8 \qquad \text{Formula 2}$$

omg5 and omg9 respectively represent engine revolution speeds of an identical cylinder in combustion processes one combustion cycle before omg1 and two combustion cycles before omg1.

Accordingly, by comparing a revolution speed of a current cylinder with revolution speeds of the cylinder one and two cycles before, only change in the engine revolution speeds can be calculated without effects of the component tolerance of a sensor plate 61 (to be described later) and imbalance between the cylinders.

Here, a correction term is obtained by averaging change in an ignition cycle by the number of sparks so as to conform a revolution speed computing period to that of the main diagnostic value domg.

In addition, for computing an each-cylinder correction term (to be described later), a revolution speed change comparison term neslopeB (see Formula 3) for comparing a current cylinder and the cylinder three ignitions before is added at the same time.

$$\text{Revolution speed change comparison term: } neslopeB = \{(omg4 - omg1)/3 + (omg8 - omg5)/3\}/2 \qquad \text{Formula 3}$$

<Each-Cylinder Correction Term>

The position sensor 62 magnetically reads a vane (peripheral tooth) of the sensor plate 61 rotating in synchronization with the crankshaft, and therefore the engine revolution speed is computed.

The sensor plate 61 includes a fluctuation in component tolerance, and errors in the engine revolution speed occur depending on the read vane.

In the existing difference formula, the errors are reduced by using a comparative cylinder. However, in the difference formula (main diagnostic value) of the present example, there is no comparative cylinder, and therefore an each-cylinder correction term dcy1 (see Formula 4) is added instead.

$$\text{Each-cylinder correction term: } dcy1=[\{(omg4-omg1)/3-(omg5-omg1)/4\}\times 3\times omg0/omg4+\{(omg8-omg5)/3-(omg9-omg5)/4\}\times 3\times omg0/omg8]/2=(neslopeB-neslopeA)\times 3\times omg0/[(omg4+omg8)/2] \quad \text{Formula 4}$$

As described above, a difference between the revolution speed change correction term neslopeA and the revolution speed change comparison term neslopeB is used for computing the each-cylinder correction term.

Change in revolution speeds in an identical section (identical period) is computed with respect to a cylinder that is not affected by tolerance of the sensor plate 61 and an adjacent cylinder that is affected by the tolerance, a difference thereof is obtained, and only an error between the cylinders included in the revolution speeds is extracted.

"3×omg0/[(omg4+omg8)/2" in the last part of the correction term restores the error between the cylinders that have been averaged when the change in the revolution speeds has been computed, and subsequently corrects the error to a value for predicting an error that may occur in a current cylinder.

By using the main diagnostic value and the correction terms, a corrected diagnostic value (difference formula) domgIDL is defined by the following Formula 5 and Formula 6.

In a case where continuous change in engine revolution speeds is small and is equal to or less than any set threshold neslopelim, Formula 5 for correcting only a sensor plate error (error between cylinders) in the main diagnostic value is used. In a case where the continuous change in engine revolution speeds is greater than the threshold neslopelim, Formula 6 for additionally correcting an inclination offset is used.

$$\text{Corrected diagnostic value: } domgIDL=domg+dcy1$$
$$(|neslopeA|<neslopelim) \quad \text{Formula 5}$$

$$domgIDL=domg-neslopeA+dcy1$$
$$(|neslopeA|>neslopelim) \quad \text{Formula 6}$$

As described above, FIG. 2 illustrates an effect of setting the threshold neslopelim of the corrected diagnostic value.

Figure 2:
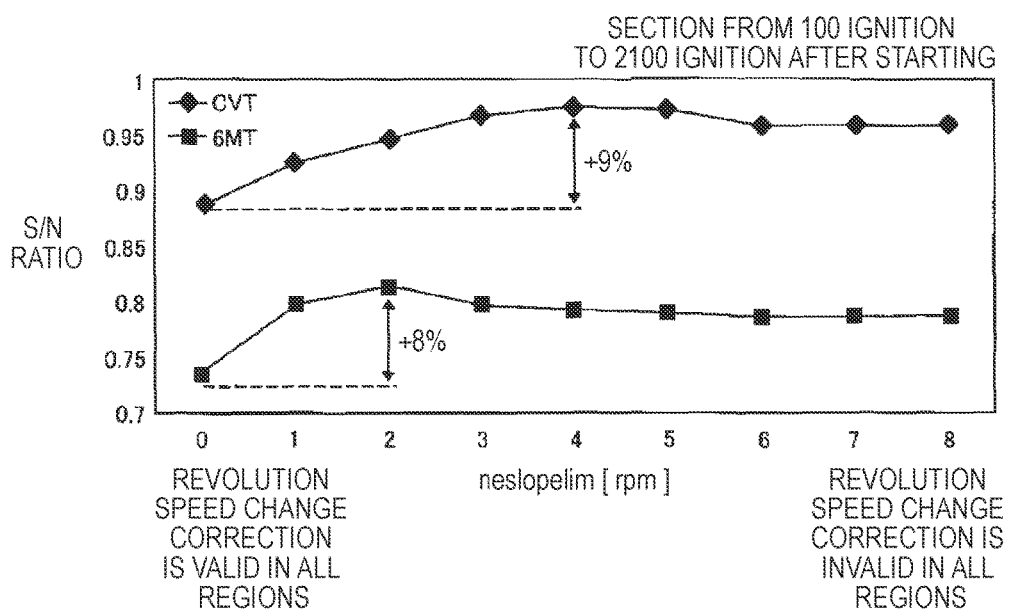
FIG. 2 is a graph illustrating an instance of a correlation between an S/N ratio and a size of a region in which revolution speed change correction is validated.

FIG. 2 is a graph illustrating an instance of a correlation between an S/N ratio and a size of a region in which revolution speed change correction is validated.

In FIG. 2, a horizontal axis represents a value of the threshold neslopelim. In the left end of the graph, the revolution speed change correction is valid in all regions. In the right end, the revolution speed change correction is invalid in all regions.

A vertical axis represents an S/N ratio in misfire detection.

FIG. 2 illustrates data in a case where a transmission combined with the engine 1 is a continuously variable transmission (CVT), and data in a case where the transmission combined with the engine 1 is a six-gear manual transmission (6MT).

As illustrated in FIG. 2, the S/N ratios of both the CVT and 6MT increase by slightly less than 10% in a case where the threshold neslopelim is set and the revolution speed change correction is switched to be valid or invalid, in comparison with a case where the e revolution speed change correction is valid in all regions.

According to the result, in computation carried out hereinafter, neslopelim=4 (rpm) is set for the CVT vehicle, and neslopelim=2 (rpm)(6MT) is set for the 6MT vehicle.

Table 1 illustrates an average diagnostic value AVE, dispersion σ, and an S/N ratio of the described corrected diagnostic value domgIDL.

Table 1 also illustrates S/N ratios of comparative examples 1 and 2 using difference formulas according to the prior arts.

TABLE 1

|  | domgIDL | | | | Comparative example 1 | Comparative example 2 |
|---|---|---|---|---|---|---|
|  | Normal state | | Misfire state | | S/N | S/N | S/N |
|  | AVE | σ | AVE | σ | ratio | ratio | ratio |
| CVT | −0.04 | 7.96 | 39.10 | 2.70 | 0.975 | 0.622 | 0.842 |
| 6MT | 0.00 | 5.04 | 24.55 | 2.72 | 0.812 | 0.482 | 0.699 |

As described above, the corrected diagnostic value according to the present example greatly improves the S/N ratio in comparison with the comparative examples 1 and 2.

However, a target level in which the S/N ratio≥1 and a normal state and a misfire state are completely separated is not reached.

Accordingly, the three-point model detection method (to be described later) is introduced into the present example.

<Three-Point Model Detection Method>

The three-point model detection method (to be described later) is introduced so as to achieve the complete separation of S/N distribution that is not achieved by using the corrected diagnostic value domgIDL.

In the three-point model detection method, difference value comparison between diagnostic values of a last cylinder and a next cylinder is incorporated into a diagnostic formula.

Figure 3A:
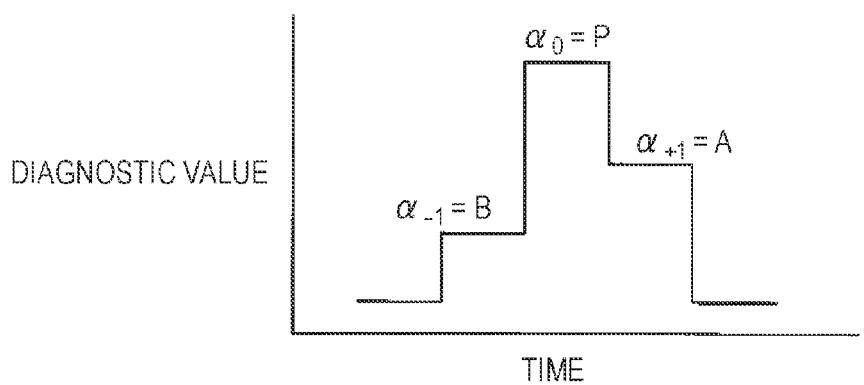
FIGS. 3A to 3C are diagrams illustrating a method for computing a model diagnostic value using a three-point model detection method.
Figure 3B:
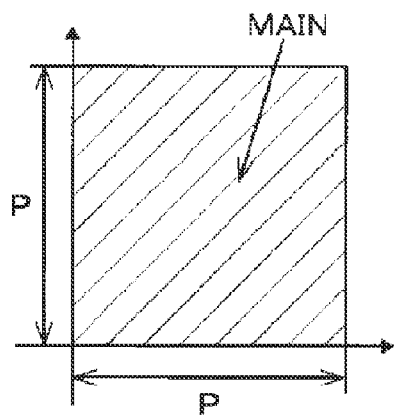
Figure 3C:
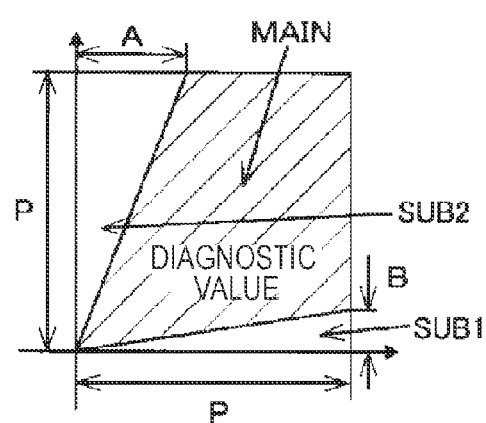

FIGS. 3A to 3C are diagrams illustrating a method for computing a model diagnostic value using a three-point model detection method.

FIG. 3A is a diagram illustrating an instance of transition between a diagnostic value α0 of a diagnosis target cylinder (current cylinder) and diagnostic values α−1 and α+1 of last and next cylinders.

FIGS. 3B and 3C are diagrams respectively illustrating a basic model and a last-and-next comparison model using a difference value between the last and next cylinders.

The model difference value domgMDL using the last-and-next comparison model is a square root of a value obtained by subtracting areas SUB1 and SUB2 of triangles whose bases are P and heights are diagnostic values B and A of the last and next cylinders, respectively, from an area MAIN obtained by a square of the diagnostic value P of the diagnosis target cylinder.

Next, details thereof are described.

A model diagnostic value SG-Model is computed from the following Formula 7.

$$\text{Model diagnostic value } SG\text{-Model}=(\alpha 0)^2-\tfrac{1}{2}\times \alpha 0\times [(\alpha-1)+(\alpha+1)] \quad \text{Formula 7}$$

where $\alpha-1=ABS(\alpha-1)$ and $\alpha+1=MAX(\alpha+1, 0)$ when $\alpha 0>0$, and $\alpha-1=ABS(\alpha-1)$ and $\alpha+1=MIN(\alpha+1, 0)$ when $\alpha 0 \leq 0$.

A model difference value is computed from the following Formula 8.

(1) When $\alpha 0>0$ and MAIN>SUB1+SUB2, $domgMDL=\{(\alpha 0)^2-\frac{1}{2}\times\alpha 0\times[(\alpha-1)+(\alpha+1)]\}^{\wedge}0.5$, (2) when $\alpha 0\leq 0$ and MAIN>SUB1+SUB2, $domgMDL=-\{(\alpha 0)^2-\frac{1}{2}\times\alpha 0\times[(\alpha-1)+(\alpha+1)]\}^{\wedge}0.5$, and (3) When MAIN<SUB1+SUB2, $domgMDL=\alpha 0$  Formula 8

According to the model diagnostic value domgMDL, a sub model 1 (SUB1) and a sub model 2 (SUB2) computed from respective last and next difference values and a central difference value are subtracted from a main model (MAIN) computed from a square of the central difference value.

With regard to the sub model 1 using a difference value of the last cylinder, computation is carried out by using an absolute value so as to set the sub model 1 as an indicator of revolution speed dispersion.

On the other hand, with regard to the sub model 2 using a difference value of the next cylinder, computation is carried out only in a case where signs of the central difference value and the difference value of the next cylinder are the same so as to avoid false computation in revolution speed recovery after a misfire.

The value computed by subtracting the sub model from the main model is defined as the model diagnostic value SG-Model as illustrated in Formula 7. Subsequently, the model difference value domgMDL used for misfire detection is computed by using Formula 8.

Note that, the central difference value is directly used for the detection as the model difference value SG-Model in a case where SG-Model is a negative value (in a situation in which the sub model is greater than the main model).

In the misfire detection, the model difference value domgMDL is compared with a detection difference value (compatible value) that is a preset threshold. In a case where the model difference value domgMDL is equal to or greater than the detection difference value, the misfire is detected.

Effects of the present example are described below.

Figure 4:
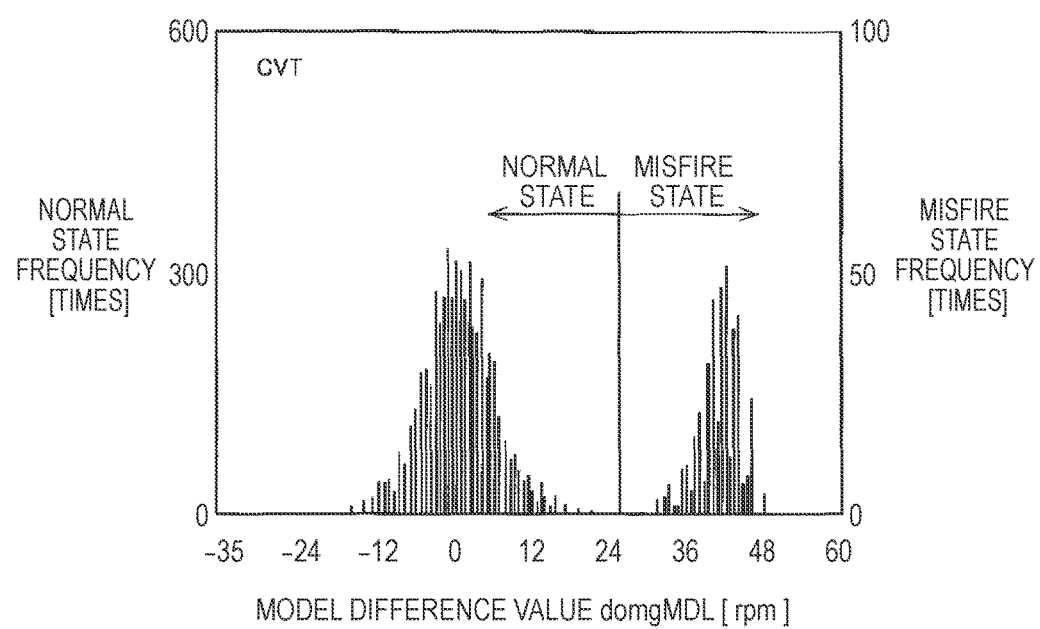
FIG. 4 is a diagram illustrating an instance of diagnostic value frequency distribution in a normal state and a misfire state according to the misfire detection device in the example, the diagram illustrating data in a case of a CVT vehicle.

FIG. 4 is a diagram illustrating an instance of diagnostic value frequency distribution in a normal state and a misfire state according to the misfire detection device in the example, the diagram illustrating data in a case of a CVT vehicle.

Figure 5:
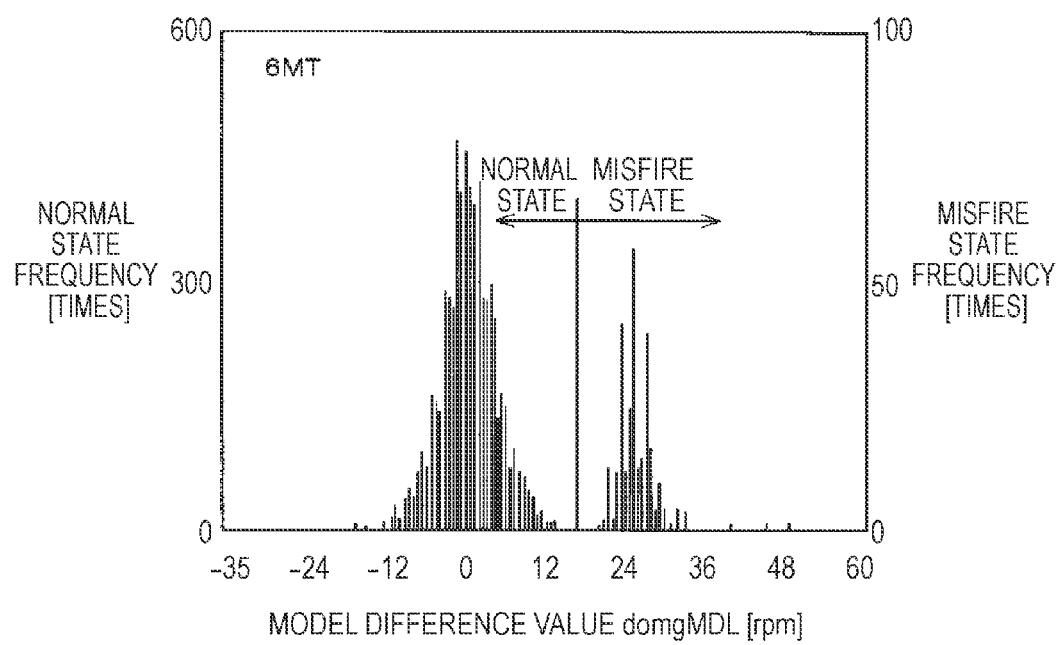
FIG. 5 is a diagram illustrating an instance of diagnostic value frequency distribution in a normal state and a misfire state according to the misfire detection device in the example, the diagram illustrating data in a case of a 6MT vehicle.

FIG. 5 is a diagram illustrating an instance of diagnostic value frequency distribution in a normal state and a misfire state according to the misfire detection device in the example, the diagram illustrating data in a case of a 6MT vehicle.

In FIGS. 4 and 5, in addition to a usual state, the normal state (state in which there is no misfire) is set to a condition in which a case where a predetermined amount of air-fuel ratio offset attributed to component tolerance occurs in comparison with the usual state, a case where a predetermined amount of imbalance occurs between adjacent cylinders, and a case where a predetermined amount of imbalance occurs between cylinders facing to each other are mixed.

On the other hand, the misfire state is set to a condition in which cases where 1%, 3%, and 5% of all ignition are misfire are mixed.

As illustrated in FIGS. 4 and 5, the normal state and the misfire state is separated substantially completely (the S/N ratio is equal to or greater than 1) in the diagnostic value distribution of both CVT and 6MT.

According to the present example, reduction in engine revolution speed at the time of misfire can be extracted accurately by using a difference between a rotational speed of a diagnosis target cylinder (current cylinder) in a combustion process and a rotational speed of a last cylinder in a combustion process as a diagnostic value.

Therefore, a misfire detection can be carried out appropriately even at a time of fast idle or the like having an unstable combustion state.

In addition, it is possible to correct an error in rotational speed detection between cylinders due to imbalance in teeth intervals depending on manufacturing tolerance of a sensor plate of a crank angle sensor, for instance, and to improve detection accuracy.

For instance, in a case of a four cylinder engine in which explosion is carried out at equal intervals, a correction value can be computed by comparing revolution speeds of a current cylinder with a cylinder three ignition before in each combustion process.

In addition, in a case where change in the engine revolution speed itself is small and there is less need to correct change in the revolution speed, reduction in diagnosis accuracy due to excessive correction can be prevented by not carrying out the correction.

In addition, it is possible to carry out a misfire detection more accurately by adding an effect of a diagnostic value to a diagnostic value of a current diagnosis target cylinder with use of relatively simple calculation when at least one of a last cylinder and a next cylinder whose ignition orders are immediately before and after the diagnosis target cylinder is the diagnosis target cylinder.

In addition, in a case where engine revolution speed changes continuously at a time of rapid acceleration, rapid deceleration, or the like, it is possible to suppress effects of such change, prevent false detection, and secure detection accuracy.

As described above, according to the present example, it is possible to provide a misfire detection device capable of appropriately detecting a misfire even in a combustion unstable state.

(Modification)

The present disclosure is not limited to the example described above, and various modification or change can be made, and these are also within the technical scope of the present disclosure. (1) A configuration of the engine or the misfire detection device is not limited to the above described example, and can be optionally changed. For instance, the horizontally opposed four-cylinder engine is used as the engine in the present example. However, the cylinder layout and the number of cylinders can be optionally changed unless the combustion process is carried out in the cylinders at the same time.

The hardware configuration and formulas of the misfire detection device can also be optionally changed.

For instance, the engine revolution speed change correction is carried out by using diagnostic values of the last two ignition cycles in the present example. However, the number of ignition cycles is not particularly limited. (2) In the present example, the three point model detection method that uses effects from the last and next cylinders in addition to the diagnosis target cylinder is used as the model detection method. However, the present example is not limited thereto. The diagnostic value of the diagnosis target cylinder may be corrected by using one of the diagnostic value of the last cylinder and the diagnostic value of the next cylinder.

Although the preferred examples of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. A misfire detection device, comprising:
a crank angle sensor configured to detect an angular position of a crankshaft of an engine;
a rotational speed calculator configured to calculate a first rotational speed of the crankshaft and a second rotational speed of the crankshaft based on the detected angular position of the crankshaft; and
a misfire detector configured to:
obtain a first difference between the first rotational speed of the crankshaft in a first combustion process in a diagnosis target cylinder and the second rotational speed of the crankshaft in a second combustion process in a last cylinder, wherein ignition occurs in the last cylinder immediately before the ignition occurs in the diagnosis target cylinder,
set a first diagnostic value of the diagnosis target cylinder based on the obtained first difference; and
detect a misfire in the engine based on the first diagnostic value;
a controller configured to control a timing of the ignition of the diagnosis target cylinder based on the detected misfire; and
an each-cylinder corrector configured to:
compute a third rotational speed of the crankshaft in a third combustion process in a comparative cylinder, and
correct the first diagnostic value based on a second difference between the first rotational speed in the first combustion process in the diagnosis target cylinder and the third rotational speed in the third combustion process in the comparative cylinder.

2. The misfire detection device according to claim 1, further comprising:
a rotational speed change corrector configured to correct the first diagnostic value based on an amount of change in the first rotational speed of the crankshaft between cycles in the first combustion process in the diagnosis target cylinder.

3. The misfire detection device according to claim 2, wherein the rotational speed change corrector is further configured to stop the correction of the first diagnostic value based on the amount of change in the first rotational speed per unit time that is less than a determined threshold.

4. The misfire detection device according to claim 1, wherein the misfire detector is further configured to detect the misfire based on a comparison of a determined detection threshold with a model difference value,
wherein the model difference value is a square root of a value that is obtained by subtraction of ½ of a product of the first diagnostic value of the diagnosis target cylinder and a second diagnostic value of the last cylinder from a square of the first diagnostic value of the diagnosis target cylinder.

5. The misfire detection device according to claim 2, wherein the misfire detector is further configured to detect the misfire based on a comparison of a determined detection threshold with a model difference value,
wherein the model difference value is a square root of a value that is obtained by subtraction of ½ of a product of the first diagnostic value of the diagnosis target cylinder and a second diagnostic value of the last cylinder from a square of the first diagnostic value of the diagnosis target cylinder.

6. The misfire detection device according to claim 1, wherein the misfire detector is further configured to detect the misfire based on a comparison of a determined detection threshold with a model difference value,
wherein the model difference value is a square root of a value that is obtained by subtraction of ½ of a product of the first diagnostic value of the diagnosis target cylinder and a second diagnostic value of a next cylinder from a square of the first diagnostic value of the diagnosis target cylinder, wherein the ignition occurs in the next cylinder immediately after the ignition occurs in the diagnosis target cylinder.

7. The misfire detection device according to claim 2, wherein the misfire detector is further configured to detect the misfire based on a comparison of a determined detection threshold with a model difference value,
wherein the model difference value is a square root of a value that is obtained by subtraction of ½ of a product of the first diagnostic value of the diagnosis target cylinder and a second diagnostic value of a next cylinder from a square of the first diagnostic value of the diagnosis target cylinder, wherein the ignition occurs in the next cylinder immediately after the ignition occurs in the diagnosis target cylinder.

8. The misfire detection device according to claim 1, wherein the misfire detector is further configured to detect the misfire based on a comparison of a determined detection threshold with a model difference value,
wherein the model difference value is a square root of a value that is obtained by subtraction of each of ½ of a product of the first diagnostic value of the diagnosis target cylinder and a second diagnostic value of the last cylinder, and ½ of a product of the first diagnostic value of the diagnosis target cylinder and a third diagnostic value of a next cylinder from a square of the first diagnostic value of the diagnosis target cylinder, wherein the ignition occurs in the next cylinder immediately after the ignition occurs in the diagnosis target cylinder.

* * * * *